June 1, 1937. L. A. PHILIPP Re. 20,388

EVAPORATOR FOR REFRIGERATORS

Original Filed April 11, 1929

INVENTOR
LAWRENCE A. PHILIPP
BY
Fred A. Lind
ATTORNEY

Reissued June 1, 1937

Re. 20,388

UNITED STATES PATENT OFFICE 20,388

EVAPORATOR FOR REFRIGERATORS

Lawrence A. Philipp, Detroit, Mich., assignor to Kelvinator Corporation, Detroit, Mich., a corporation of Michigan Original No. 1,893,338, dated January 3, 1933, Serial No. 354,320, April 11, 1929. Application for reissue May 25, 1934, Serial No. 727,506

10 Claims. (Cl. 62—8)

The invention relates to artificial refrigeration apparatus and has particular relation to an apparatus of the above designated character which shall be especially applicable for operation automatically when a warm freezing tray is inserted therein.

An object of the invention is to provide a refrigerant liquid evaporating unit having an expansion device associated therewith which is directly controlled as a function of the temperature of the aforesaid freezing tray.

Another object of the invention is to provide a refrigeration apparatus capable of automatic operation in response to the disposition of warm substances therein, which apparatus shall likewise be capable of employment in so-called multiple unit systems.

The invention is embodied in a refrigeration apparatus employing a freezing tray sleeve, the temperature of which controls the pressure of a confined and expansible fluid for operating an expansion valve by which refrigerant liquid is admitted to a refrigerant evaporating unit associated with the sleeve. The operation of a condensing unit associated with the apparatus is controlled by a low-pressure-side controlling device the employment of which makes possible the multiple installation of apparatus of such character in association with a single condensing unit.

For a better understanding of the invention, reference may now be had to the accompanying drawing forming a part of this specification in which.

Figure 1:
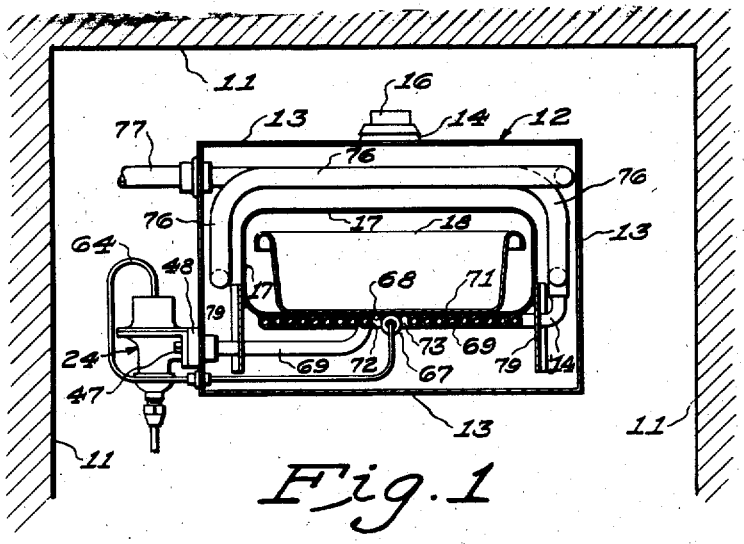
Figure 1 is a fragmentary cross-sectional view of a refrigerator cabinet embodying an evaporating unit characterizing one form which the invention may assume.
Figure 2:
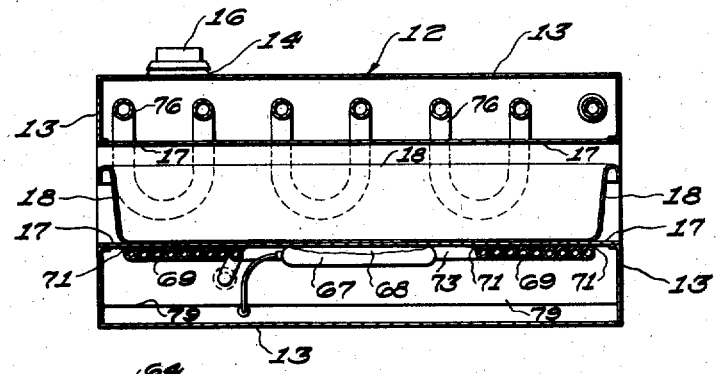
Figure 2 is a longitudinal cross-sectional view through the evaporating unit illustrated by Figure 1.
Figure 4:
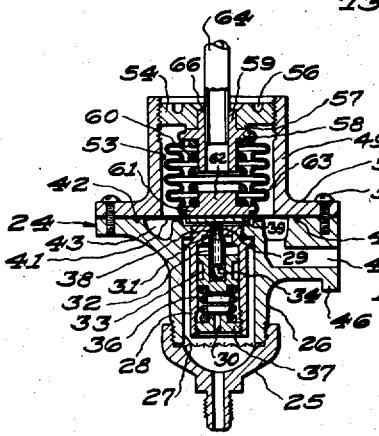
Figure 4 is a cross-sectional view of an expansion valve associated with the evaporating unit illustrated by Figures 1 and 2.
Figure 3:
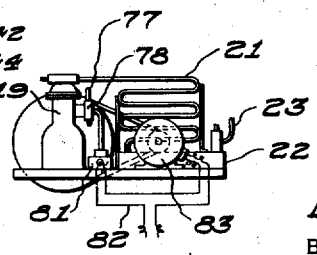
Figure 3 is a diagrammatical view illustrating a condensing unit which may be embodied in an apparatus constructed according to the principles of the invention.

An artificial refrigeration apparatus characterizing one form of the invention consists of a refrigerator cabinet 11 in which a refrigerant evaporating unit 12 is supported in any suitable manner (not shown).

A brine tank 13 may be associated with the evaporating unit or, if preferred, other suitable substances such as cast iron, aluminum, copper, earthenware, etc., may be substituted therefor. An opening 14 for the introduction of the brine solution into the tank 13 is adapted to be closed by a suitable cap 16. A metallic sleeve or heat exchanger 17, projecting internally of the tank 13, is adapted to receive and support a freezing tray 18 for containing water or other substances which are required to be frozen.

Refrigerant fluid, received under pressure from a compressor 19 and liquefied in a condenser 21, is discharged from a liquid receiver 22 through a high pressure conduit 23 and conduit coupling 25 into the high side of a refrigerant expansion valve 24. A housing 26 comprising a portion of the expansion valve 24 is provided with a centrally disposed opening 27 at the inner end of which a sleeve 28 is threaded. The threaded end of the sleeve 28 also is provided with an axially disposed orifice 29, in one extremity of which a valve 31 is seated.

A cylindrical extension portion 32 of the valve 31 is disposed in an opening formed axially in a slide member 33, the outer end of the cylindrical portion being adapted to rest upon a spherical bearing 34 which is seated in the bottom of the aforesaid opening. A spring 36 disposed within the sleeve 28 is adapted to be compressed between the slide member 33 and a threaded disc 37 adjustably secured within the sleeve 28 at the outer end thereof. An opening 30 formed centrally of the disc 37 provides for the admission of refrigerant fluid to the interior of the sleeve 28. A stem 38 of the valve 31 projecting throughout the orifice 29 is rigidly secured at the centre of a disc 39 which is located in a recess formed in the housing 26 beyond the threaded end of the sleeve 28. A metallic diaphragm 41 disposed concentrically relative to the disc 39 is soldered, as indicated at 42, in an annular recess formed in the housing 26.

A larger annular recess 43 disposed internally of the edge of the diaphragm 41 and communicating with the orifice 29 is provided with an outlet duct 44 formed in a boss portion 46 of the housing 26 by which portion the expansion valve 24 is bolted, as indicated at 47, to a boss 48 secured in an opening formed in the brine tank 13.

A casing 49 having a flange 51 bolted, as indicated at 52, to the housing 26, externally of the diaphragm 41, is provided with a centrally disposed opening 53 in the outer end of which an adjustable head 54 is threaded. Openings 56, formed in the outer surface of the head 54, provide means for adjusting the latter by the employment of a suitable spanner wrench (not shown.)

An annular shoulder 57 formed on the interior surface of the head 54 is adapted rotatably to engage a similar annular shoulder 58 formed intermediate the ends of a coupling sleeve 59, one end of which projects through a centrally disposed opening formed in the head 54. A spring 60 surrounding the opposite end of the coupling sleeve 50 and confined between the annular shoulder 58 and an annular shoulder 61 projecting from one end of a block 62 urges the latter resiliently against a central portion of the diaphragm 41 opposite the disc 39. A bellows 63, disposed within the opening 53 and surrounding the spring 60, is soldered at opposite ends to the outer peripheral portions of the shoulders 58 and 61.

A conduit 64, soldered as indicated at 66 within the coupling sleeve 59, provides communication between the interior of the bellows 63 and a tubular expansible fluid containing bulb 67 which likewise is soldered, as indicated at 68, to the central portion of the bottom surface of the sleeve 17 within the brine tank 13. When the freezing tray 18, containing a warm substance desired to be frozen, is inserted in the sleeve 17, the expansion of fluid within the bulk 67 causes a sufficient increase in the pressure within a bellows 63 to displace the diaphragm 41, the disc 39, and the valve 31, against the resilient force of the spring 36 thus admitting refrigerant liquid through the orifice 29, the annular recess 43 and into the duct 44. Hence, the liquid is conducted through a centrally disposed opening, formed in the boss 48, into a refrigerant liquid evaporating conduit 69 which is coiled in spiral formation against the lower surface of the sleeve 17 and soldered thereto as indicated at 71. The inner convolution 72 of the coiled conduit 69 should be disposed in spaced relation to the bulb 67, as indicated at 73, in order to avoid materially cooling the bulb 67 during the evaporation of fluid in the conduit 69. The discharge end 74 of the conduit 69 is connected to an end portion of a larger evaporating conduit 76 disposed in sinuous convolutions throughout the upper regions of the brine tank 13. A suction line 77 communicating with the opposite end of the coil 76 is adapted to connect the latter with the low side 78 of the compressor 19.

A pair of vertically disposed baffle plates 79 are soldered, or otherwise rigidly secured at their upper ends, to the edges of the sleeve 17, thus preventing the escape of the brine solution within the tank from beneath the sleeve 17 when the temperature of such solution is increased by the absorption of heat from the tray 18 through the heat exchanger or bottom portion of the sleeve 17 and the conduit 69.

In the operation of the invention, when refrigerant liquid is admitted to the conduit 68 through the expansion valve 24 in response to a predetermined temperature of the fluid contained in the bulb 67, the evaporation of such fluid in the inner convolutions of the coiled conduits 69 causes a substantial increase in the temperature of all of the fluid embodied in the conduits 69, 76 and 77. In response to a predetermined increase in such fluid pressure, a suction pressure control device 81 of well known construction is adapted to close an electrical circuit 82 through a motor 83 by which the compressor 19 is driven. When, after continuous operation for a considerable period, the substance contained in the freezing tray 18 is substantially or entirely frozen, the conduction of heat to the bulb 67 will decrease to such an extent that the fluid pressure within the bellows 63 is insufficient to cause the admission of any substantial amount of refrigerant liquid through the orifice 29. The rate of evaporation in the conduit 69 then will decrease to such an extent that the fluid pressure in the low side of the apparatus will permit the operation of the suction pressure control device 81 thus opening the circuit through the motor 83 and discontinuing the operation of the condensing unit. These operations constitute a complete refrigeration cycle which will be repeated at intervals whenever the temperature of the fluid in the bulb 67, by reason of its absorption of heat, either from the freezing tray 18, or from the brine tank 13, increases to a value sufficient to cause the operation of the expansion valve 24.

Although the specification discloses only the preferred form of this invention, and describes in detail but a single application thereof, it will be apparent to those skilled in the art that the invention is not so limited but that various modifications and changes may be made therein without departing from the spirit of the invention or from the scope of the appended claims.

I claim:

1. The combination with a refrigerant compressing mechanism having a low side pressure controller associated therewith of a refrigerant evaporating unit comprising a heat exchange plate for supporting a freezing tray upon the upper surface thereof, and means disposed in thermal contact with the lower surface of the aforesaid plate for controlling the operation of the refrigerant evaporating unit.

2. A refrigerant evaporating unit comprising a brine tank having a freezing tray supported by a metallic sleeve projecting internally of said tank, a refrigerant fluid evaporating conduit disposed in thermal contact with the bottom of the sleeve, means for expanding refrigerant fluid into said conduit, and means in thermal contact with the lower surface of the aforesaid sleeve for controlling the operation of the aforesaid expansion means.

3. A refrigerant evaporating unit comprising a brine tank having a horizontally disposed sleeve projecting internally thereof, a refrigerant fluid evaporating conduit disposed in thermal contact with the bottom of the sleeve, a hollow tube containing a thermostat actuating fluid soldered to the bottom of the sleeve in spaced relation to the aforesaid conduit, and means controlled by the expansion of the aforesaid fluid for controlling the expansion of refrigerant liquid into the refrigerant evaporating conduit.

4. A refrigerant evaporating unit comprising a metallic heat exchange plate for supporting a freezing tray on the upper surface thereof, a refrigerant fluid evaporating conduit disposed in thermal contact with the bottom surface of the plate, means for expanding refrigerant fluid into the aforesaid conduit, a second conduit communicating with the first for evaporating refrigerant fluid received from the latter, and an expansible fluid containing bulb in thermal contact with the bottom of the aforesaid plate for controlling the operation of the aforesaid expansion means.

5. A refrigerant evaporating unit comprising a metallic heat exchanger for supporting a freezing tray on the upper surface thereof, a refrigerant fluid evaporating conduit disposed in thermal contact with the bottom of the aforesaid heat exchanger; a liquid heat retaining substance associated with the aforesaid conduit and bottom of the heat exchanger, means for preventing the circulation of the aforesaid substance under the influence of heat absorbed from the heat exchanger and conduit, and means associated with the lower surface of the heat exchanger for controlling the expansion of a refrigerant fluid in the aforesaid evaporating conduit.

6. A refrigerant evaporating unit comprising a metallic heat exchanger disposed in thermal contact with a freezing tray, means in thermal contact with the heat exchanger for evaporating a refrigerant fluid, a valve for controlling the admission of refrigerant fluid within the last mentioned means, and a confined expansible fluid associated with the heat exchanger and the valve for controlling the operation of the latter.

7. A refrigerant evaporating unit comprising a brine tank having a sleeve projecting therein for supporting a freezing tray, a refrigerant evaporating conduit soldered to the bottom of the sleeve, an expansion valve for the admission of refrigerant liquid into the evaporating conduit, a confined expansible fluid associated with the evaporating unit for controlling the operation of the aforesaid expansion valve.

8. A refrigerant evaporating unit comprising a brine tank having a sleeve projecting therein for supporting a freezing tray, a refrigerant evaporating conduit soldered to the bottom of the sleeve, baffle means projecting below the sleeve for confining a brine solution therein, an expansion valve for the admission of refrigerant liquid into the evaporating conduit, and a confined expansible fluid associated with the evaporating unit for controlling the operation of the aforesaid expansion valve.

9. A refrigerator comprising in combination, a refrigerating compartment, in which air is circulated, a heat absorber within the compartment for cooling the air, an ice tray or the like intimately associated with the heat absorber, means for causing such circulation of refrigerant through the heat absorber so as to maintain the heat absorber between predetermined temperature limits at all times during normal operation, and another means for controlling the circulation of refrigerant through the heat absorber, said last means including a control thermostat disposed in intimate heat exchange relation with substance in the tray.

10. A refrigerator comprising in combination, a refrigerating compartment, in which air is circulated, a heat absorber within the compartment for cooling the air, an ice tray or the like intimately associated with the heat absorber, means for causing such circulation of refrigerant through the heat absorber so as to maintain the heat absorber between predetermined temperature limits at all times during normal operation, and a thermostat arranged in intimate heat exchange relation with and responsive primarily to the temperature of non-frozen substance in the tray, when the tray is in position, for increasing circulation of refrigerant through the heat absorber when the substance is in a non-frozen state.

LAWRENCE A. PHILIPP.